United States Patent
Chen et al.

(10) Patent No.: US 8,112,722 B2
(45) Date of Patent: Feb. 7, 2012

(54) METHOD AND SYSTEM OF CONTROLLING A CURSOR IN A THREE-DIMENSIONAL GRAPHICAL ENVIRONMENT

(75) Inventors: Enyi Chen, Beijing (CN); Zhao Xia Jin, Shanghai (CN); Thomas A. Plocher, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 960 days.

(21) Appl. No.: 12/034,940

(22) Filed: Feb. 21, 2008

(65) Prior Publication Data
US 2009/0217209 A1  Aug. 27, 2009

(51) Int. Cl.
*G06F 3/048* (2006.01)
(52) U.S. Cl. ......... 715/856; 715/861; 715/862; 715/857
(58) Field of Classification Search .................. 715/808, 715/851, 856, 861; 345/157, 419
See application file for complete search history.

(56) References Cited

U.S. PATENT DOCUMENTS

| | | | | |
|---|---|---|---|---|
| 5,703,620 | A * | 12/1997 | Keyson | 715/856 |
| 5,757,358 | A * | 5/1998 | Osga | 715/862 |
| 6,049,326 | A * | 4/2000 | Beyda et al. | 345/157 |
| 6,642,947 | B2 * | 11/2003 | Feierbach | 715/861 |
| 7,043,701 | B2 | 5/2006 | Gordon | |
| 7,324,085 | B2 * | 1/2008 | Balakrishnan et al. | 345/157 |
| 7,348,997 | B1 * | 3/2008 | Croft | 345/629 |
| 2007/0132756 | A1 | 6/2007 | Plocher et al. | |
| 2008/0051081 | A1 | 2/2008 | Nelson | |

FOREIGN PATENT DOCUMENTS

JP    2003216295    7/2003

OTHER PUBLICATIONS

Nguyen-Thong Dang, A Survey and Classification of 3D Pointing Techniques, 2007, 71-79.*
Balakrishnan, Beating Fitts Law: Virtual Enhancements for Pointing Facilitation, 2004, Int. J Human Computer Studies 61, 857-874.*
Vanacken et al., Exploring the Effects of Environment Density and Target Visibility on Object Selection in 3D Virtual Environments, 2007.*
Grossman et al., "The Bubble Cursor: Enhancing Target Acquisition by Dynamic Resizing of the Cursor's Activation Area", "CHI 2005", Apr. 2-7, 2005, pp. 281-291, Publisher: ACM, Published in: Portland USA.

(Continued)

*Primary Examiner* — Boris Pesin
*Assistant Examiner* — Matthew Ell
(74) *Attorney, Agent, or Firm* — Fogg & Powers LLC

(57) ABSTRACT

A method of controlling a cursor displayed on a display device is provided. A three-dimensional environment is displayed on a display device. A cursor and a plurality of objects are displayed on the display device within the three-dimensional environment. The cursor comprises a zone defining a volume to identify at least one object that is at least partially located within the volume. The size of the volumetric activation zone is dynamically adjusted so that a predetermined constraint is satisfied. The predetermined constraint is a function of at least a relationship between the volumetric activation zone of the cursor and at least one of the plurality of objects.

22 Claims, 9 Drawing Sheets

OTHER PUBLICATIONS

Guiard et al., "Method for Displaying Opacity Desktop With Depth Perception", "Proceedings of Graphics Interface 2004", 2004, pp. 9-18, vol. 62, Publisher: ACM International Conference Proceeding Series, Published in: Marseille France.

Zhai et al., "The Silk Cursor: Investigating Transparency for 3D Target Acquisition", "Human Factors in Computing Systems", Apr. 24-28, 1994, pp. 459-483, Publisher: ACM, Published in: Toronto Canada.

* cited by examiner

METHOD AND SYSTEM OF CONTROLLING A CURSOR IN A THREE-DIMENSIONAL GRAPHICAL ENVIRONMENT

BACKGROUND

Computers and other processing hardware such as graphics processing units (GPU) and physics processing units (PPU) continue to increase in performance capabilities. This is enabling computers to display true three-dimensional (3D) environments. In conjunction with the improvement in such processing hardware, the development of stereoscopic 3D display devices, such as 3D glasses and 3D display monitors having depth perception, enables observers to view represented objects in a more natural way, as if the objects were physically present in front of them. The advantages of three-dimensional displays include increased functionality and more accurate displays of real life scenes, such as buildings. These advantages are helpful in many applications, including graphical displays of 3D models of large buildings. These 3D models can support situational awareness in a variety of domains, including firefighting, building security, and heating ventilation and air conditioning (HVAC) management.

A typical graphical user interface (GUI) includes mechanisms for cursor navigation and the selection of (or other interaction with) graphical objects (for example, user-interface control objects and application-specific objects). For example, after an object is selected, a user may be able to obtain information about the selected object, manipulate it, etc. In three-dimensional interaction applications, however, navigating and selecting objects offers challenges not present in a 2D display scene. For example, a three-dimensional environment provides more space for additional objects. Thus, a complex model of a building may include thousands of objects, which can greatly affect the ability to effectively select a desired object. Another challenge is that a front object may occlude objects behind it, and a hollow object may occlude interior objects. Three-dimensional environments also provide increased space through which a cursor may move, which increases the average distance between objects. The increased distance translates into increased time for each movement of the cursor from one location to a target object which is to be selected. Generally, the time required to select a target is described by Fitt's Law. Fitt's Law states that the time (MT) to select a target with a width W and a distance (amplitude) A from the cursor can be predicted by the equation: $MT=a+b*\log_2(A/W+1)$, where a and b are empirically determined constants. The logarithmic term is an index of difficulty of the task.

Previous cursor research, focused mainly on 2D applications, found some success reducing the time required to select a target with a cursor by decreasing A (for example, jumping the cursor to the target), or increasing W (for example, adopting an area cursor instead of a point cursor). However, these approaches are typically difficult to apply to a 3D display scene because navigating and selecting targets in a 3-dimensional scene adds many difficulties described above due to display depth (third dimension) and object occlusion.

SUMMARY

The following summary is made by way of example and not by way of limitation. In one embodiment, a method of controlling a cursor displayed on a display device is provided. The method includes displaying a three-dimensional environment on a display device. The method further includes displaying, on the display device, a cursor and a plurality of objects within the three-dimensional environment. The cursor includes a zone defining a volume to identify at least one object that is at least partially located within the volume. The method further includes dynamically adjusting the size of the volumetric activation zone so that a predetermined constraint is satisfied. The predetermined constraint is a function of (at least) a relationship between the volumetric activation zone of the cursor and at least one of the plurality of objects.

DRAWINGS

In accordance with common practice, the various described features are not drawn to scale but are drawn to emphasize specific features relevant to the present disclosure.

DETAILED DESCRIPTION

Figure 1:
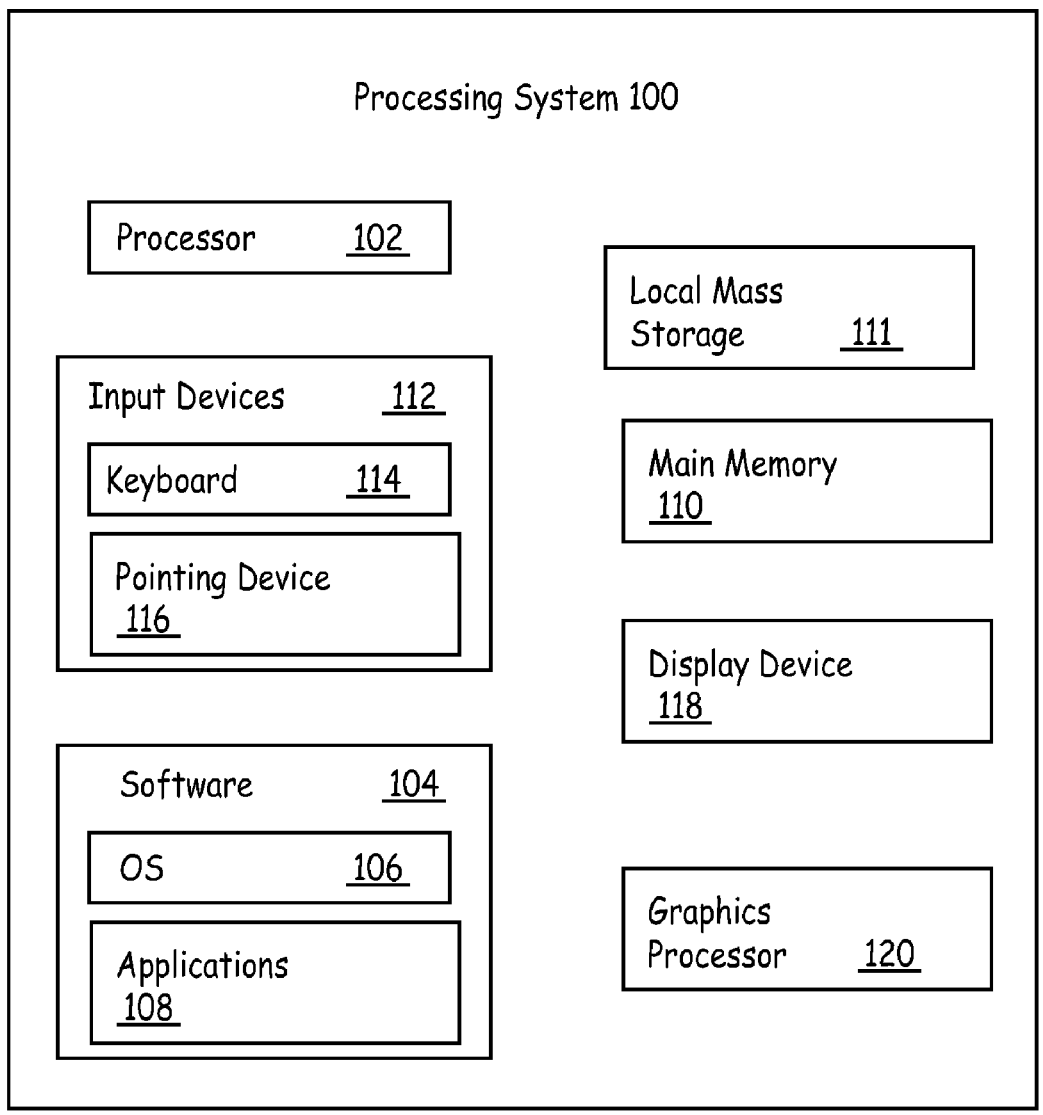
FIG. 1 is a block diagram of one embodiment of a processing system for displaying a three-dimensional interface and controlling a cursor.

FIG. 1 is a high-level block diagram of one embodiment of a processing system 100 for displaying a three-dimensional graphical environment and controlling a cursor therein. Processing system 100 can be implemented in various form factors and configurations including, for example, as a desktop computer, portable computer, media center, cell phone, and network computer. Moreover, in other embodiments, processing system 100 is embedded in (or otherwise incorporated in or communicatively coupled to) other electrical systems or devices. In the embodiment illustrated in FIG. 1, processing system 100 comprises a computer (also referred to here as "computer" 100).

Computer 100 comprises at least one programmable processor 102 (also referred to herein as "processor 102"). In one embodiment, processor 102 comprises a microprocessor. Processor 102 executes various items of software 104. In the embodiment shown in FIG. 1, software 104 executed by processor 102 comprises an operating system (OS) 106 and one or more applications 108. Software 104 comprises program instructions that are embodied on one or more items of processor-readable media (for example, a hard disk drive (or other mass storage device) local to the computer 100 and/or shared media such as a file server that is accessed over a network such as a local area network or wide area network such as the Internet). For example in one such embodiment, software 104 is executed on computer 100 and stored on a file server that is coupled to computer 100 over, for example, a network. In such an embodiment, computer 100 retrieves software 104 from the file server over the network in order to execute software 104. In other embodiments, such software is delivered to computer 100 for execution thereon in other ways. For example, in one such other embodiment, software 104 is implemented as a servelet (for example, in the JAVA programming language) that is downloaded from a hypertext transfer protocol (HTTP) server and executed using an Internet browser running on computer 100.

Typically, a portion of software 104 executed by processor 102 and one or more data structures used by software 104 during execution are stored in a main memory 110. Main memory 110 comprises, in one embodiment, any suitable form of random access memory (RAM) now known or later developed, such as dynamic random access memory (DRAM). In other embodiments, other types of memory are used.

Computer 100 comprises one or more local mass storage devices 111 such as hard disk drives, optical drives such as compact disc read-only memory (CDROM) drives and/or digital video disc (DVD) optical drives, USB flash drives, USB hard disk drives, and floppy drives. In some implementations, the data storage media and/or the read/write drive mechanism itself is removable (that is, can be removed from the computer 100). Computer 100 comprises appropriate buses and interfaces for communicatively coupling such local mass storage devices 111 to computer 100 and the components thereof.

One or more input devices 112 are communicatively coupled to computer 100 by which a user (or other source) is able to provide input to computer 100. In the embodiment shown in FIG. 1, input devices 112 comprise a keyboard 114 and a pointing device 116 (such as a mouse or a touch-pad). In other embodiments, input devices 112 comprise specialty devices such as a joystick, video game controller, or other device as known to those skilled in the art. In some implementations of the embodiment shown in FIG. 1, computer 100 includes one or more interfaces by which external input devices are communicatively coupled to the computer 100. Examples of such interfaces include dedicated keyboard/ pointing device interfaces (for example, a PS/2 interface) and general-purpose input/output interfaces (for example, a universal serial port (USB) interface or BLUETOOTH interface). In other implementations (for example, where computer 100 comprises a portable computer), keyboard 114 and pointing device 116 are integrated into computer 100. In some of those implementations, a keyboard and/or pointing device external to the portable computer can also be communicatively coupled to computer 100. In one embodiment, input devices 112 are located remotely from processor 102. In such an embodiment, input devices 112 are communicatively coupled to processor 102 and main memory 110 through a network or other long distance means as known to those skilled in the art.

One or more display devices 118 are communicatively coupled to computer 100 on or by which computer 100 is able to display output for a user. In some other implementations of the embodiment shown in FIG. 1, computer 100 comprises one or more interfaces by which one or more external display devices are communicatively coupled to computer 100. In other implementations (for example, where computer 100 comprises a portable computer), display device 118 comprises a display that is integrated into computer 100 (for example, an integrated liquid crystal display). In some of those implementations, computer 100 also includes one or more interfaces by which one or more external display devices (for example, one or more external computer displays) can be communicatively coupled computer 100. In one embodiment, display devices 118 are located remotely from processor 102. In such an embodiment, display devices 118 are communicatively coupled to processor 102 and main memory 110 through a network or other long distance means as known to those skilled in the art. In one embodiment, display device 118 comprises a stereoscopic 3D display device (such as 3D glasses or a 3D display monitor) having depth perception.

In the embodiment shown in FIG. 1, computer 100 also includes a graphics processing unit (GPU) 120 that provides an interface between display device 118 and the other components of computer 100. In one embodiment, GPU 120 performs processing used to implement complex algorithms for manipulating and displaying graphics on display device 118. In one embodiment, GPU provides support for 3D computer graphics which are output on display device 118.

A three-dimensional graphical environment is displayed on the display device 118. Such a 3D graphical environment comprises a graphical user interface (GUI) that enables a user to interact with graphical objects that are displayed in the 3D graphical environment and to move such objects along three axes which are normal to each other. In one implementation of such an embodiment, the 3D graphical environment (and the GUI used therein) is implemented using one of the MICROSOFT WINDOWS family of operating systems (and the graphical system provided therewith). In other implementations, one of the APPLE MACINTOSH family of operating systems (and the graphical system provided therewith), the X WINDOW SYSTEM graphical system, or other public or proprietary graphical systems are used to implement such a 3D graphical environment (and the GUI used therein).

In one implementation, such a 3D graphical environment is displayed and controlled by and the processing described below in connection with FIGS. 2-9 is performed at least in part by an application executing in what is otherwise a two-dimensional (2D) environment, where the 3D GUI discussed in more detail below is implemented at the application level. In other implementations, such a 3D environment is implemented at the operating system and/or baseline graphical system level, such that the 3D graphical environment and the processing described below in connection with FIGS. 2-9 is provided generally for all applications running within that operating system or graphical system.

Figure 2:
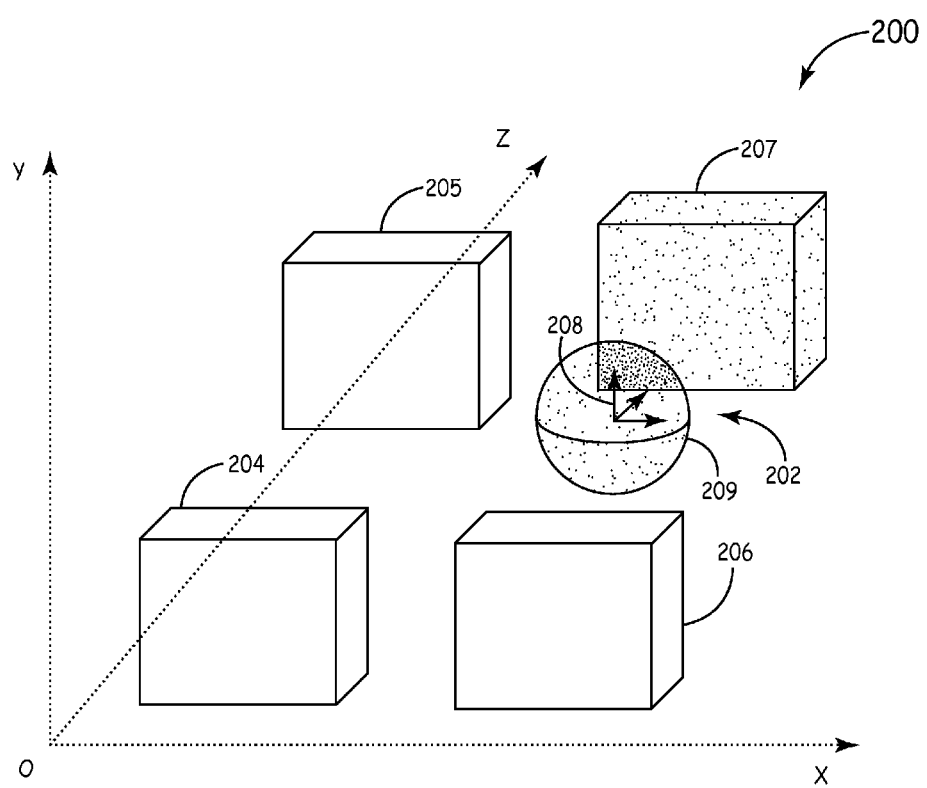
FIG. 2 is a perspective view of one embodiment of a 3D environment illustrating a plurality of objects and a cursor.

FIG. 2 illustrates a perspective view of one embodiment of a 3D environment 200 that is displayed on display device 118 of computer 100. The embodiment of 3D environment 200 shown in FIG. 2 is described here as being implanted using the computer 100 of FIG. 1, though it is to be understood that the environment can be implemented in other ways. Environment 200 includes a cursor 202 and four objects 204, 205, 206, 207. Cursor 202 has a volumetric activation zone 209. The activation zone 209 of the cursor 202 is the portion of the cursor 202 that is used to identify which object or objects a particular action is to affect (also referred to here as the "targeted object or objects"). The activation zone 209 of the cursor 202 is "volumetric" in that the portion of the cursor 202 that is used to identify the targeted object or objects is a three-dimensional space within the 3D environment 200. More specifically, the targeted objects are those objects (if any) that have a portion of their volume located within the volumetric activation zone 209 of the cursor 202. In contrast to the "volumetric" activation zone 209 of cursor 202, a conventional "point" cursor used in two-dimensional (2D) environments has an activation zone consisting of a single pixel, where the targeted object is that object (if any) that has the active pixel of such a point cursor located over a portion of its displayed area. For example, a typical point cursor that is displayed in the shape of arrow has an activation zone that consists of the pixel at the tip of the point of the arrow.

In the embodiment shown in FIG. 2, a user is able to move the cursor 202 and select (and otherwise interact) with objects displayed in the 3D environment by providing appropriate input using one or more input devices 112 (for example, using pointing device 116). Software 104 executing on the computer 100 causes the cursor 202 to move and otherwise interact with the 3D environment 200 in response to such input, in response to which the state of the display device 118 is update to reflect such interaction. For example, a user can "click" on an object displayed within the 3D environment 200 by manipulating the pointing device 116 to position the cursor 202 so that at least a portion of that object is located in the three-dimensional space occupied by the activation zone of cursor 202 and then actuating a button (or other switch) included in the pointing device 116.

In the embodiment shown in FIG. 2, a triad axis 208 is displayed as a part of cursor 202. The triad axis 208 originates from the center of the spherical activation zone of cursor 202. Triad axis 208 provides a visual indication of the location of the center of the activation zone of cursor 202 and also provides visual indication of the three dimensional nature of the activation zone.

In the embodiment shown in FIG. 2, cursor 202 comprises a spherical activation zone 209 that is displayed with a semi-transparent shell. An activation zone 209 having a spherical shape enables all portions of an edge of the activation zone to be the same distance from the center of the activation zone 209. Although in this embodiment the activation zone 209 of cursor 202 is spherical, other shapes are contemplated as within the scope of the invention (such as cubical, pyramidal, parallelepiped, and others). Additionally, in the embodiment shown in FIG. 2, cursor 202 consists of only the activation zone 209. The activation zone 209 of cursor 202 is displayed as a semi-transparent shell such that objects behind (from the user's viewpoint) and inside of cursor 202 are visible through the shell of cursor 202. In other embodiments, cursor 202 has a tail or other body structure that is displayed, but is not part of the activation area. The additional body structure for cursor 202 may be included for aesthetic or guidance reasons, similar to a conventional arrow cursor. In still other embodiments, only a body structure of cursor 202 is displayed, not the activation zone.

Objects 204-207 are components of environment 200 with which a user interacts. In the embodiment shown in FIG. 2, objects 204-207 are simple cube structures that are able to be selected by cursor 202. Objects 204-207 are able to be selected by cursor 202 when any part of an object 204-207 is within the activation zone of cursor 202. In other embodiments, objects 204-207 have other shapes (such as spheres) or are illustrations of real world objects (such as an automobile). Objects 204-207 may be three-dimensional, two-dimensional, one-dimensional, or even a zero-dimensional point. Additionally, cursor 202 is typically used to cause other actions to be performed on objects 204-207 in addition to selection.

In one embodiment, the size of the activation zone of cursor 202 is adjustable. This enhances the effectiveness of operating cursor 202 in a three-dimensional environment. In one embodiment, cursor 202 is dynamically adjustable such that only one object 204-207 is within the activation zone of cursor 202 at a time. This enables cursor 202 to select a single object 204-207 among a plurality of objects 204-207 regardless of the location of objects 204-207 or the size of objects 204-207 (assuming two or more of objects 204-207 do not completely overlap). In contrast, a cursor with a volumetric activation zone having a static size may have more than one object located within the volumetric activation zone at any given time. For example, when two or more objects are in close proximity to one another, there may be situations where an activation zone of a static size cannot be positioned to select one particular object without selecting at least one other object. Thus, with a static volume activation zone it is possible to have multiple objects within the activation zone simultaneously. In some applications this is not desirable because using such a cursor to cause an action to be taken with multiple items in the activation zone may cause uncertainty as to which object of the multiple objects within the activation zone should be acted upon. Thus, in the embodiment shown in FIG. 2, the size of cursor 202 is adjustable such that cursor 202 has a single object 204-207 within its activation zone 209 at a time. Additionally, cursor 202 is adjusted dynamically as cursor 202 is moved through environment 200 or as environment 200 changes around cursor 202. Thus, the size of the activation zone 209 of cursor 202 changes based on the current position of cursor 202 and environment 200 around cursor 200.

In one embodiment, the size of the activation zone 209 of cursor 202 is adjusted based on the distance from cursor 202 to surrounding objects 204-207.

Figure 3:
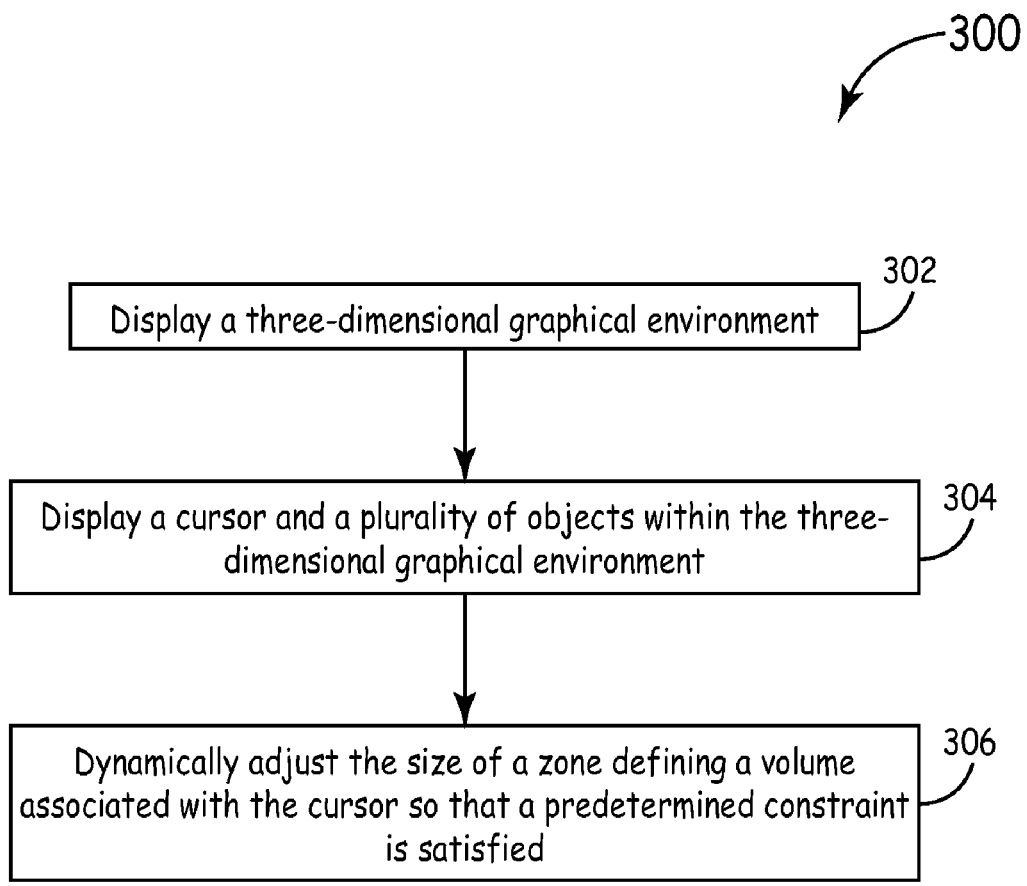
FIG. 3 is a flow chart of one embodiment of a method of controlling a cursor displayed on a display device.

FIG. 3 is a flow chart illustrating a method 300 of a method of controlling a cursor in a 3D graphical environment displayed on a display device. The particular embodiment of method 300 shown in FIG. 3 is described here as being implemented using the computer 100 of FIG. 1 and the 3D environment 200 of FIG. 2, though other embodiments are implemented in other ways. More specifically, the processing of method 300, in such an embodiment, would be implemented at least in part by the software 104 executed by the computer 100 (for example, by an operating system 106 or by one or more applications 108).

At block 302 of method 300, a three-dimensional graphical environment is displayed on a display device (for example display device 118 of computer 100). At block 304, a cursor (for example cursor 202) and a plurality of objects (for example objects 204-207) are displayed on the display device 118 within the three-dimensional graphical environment. The size of the volumetric activation zone 209 of the cursor 202 is dynamically adjusted so that a predetermined constraint is satisfied (block 306). The predetermined constraint is a function of (at least) a relationship between the zone and at least one of the plurality of objects displayed in the three-dimensional graphical environment. In one embodiment, the adjusted volumetric activation zone 209 is redisplayed after each adjustment.

Examples of such predetermined constraints include a constraint specifying that only a predetermined number of objects are at least partially located within the volumetric activation zone 209 of the cursor 202 and a constraint specifying that each change in the size of the volumetric activation zone 209 is the minimum change that otherwise satisfies any other relevant constraints.

In some implementations of such an embodiment, such dynamic adjustment of the volumetric activation zone of the cursor is accomplished by determining the distance from at least one object displayed in the 3D environment 200 and the activation zone 209 of the cursor 202 for the current position of cursor 202 and then adjusting (if necessary) the size of the volumetric activation zone 209 of the cursor 202 based on at least that distance. One example of such an embodiment is shown in FIG. 4.

Figure 4:
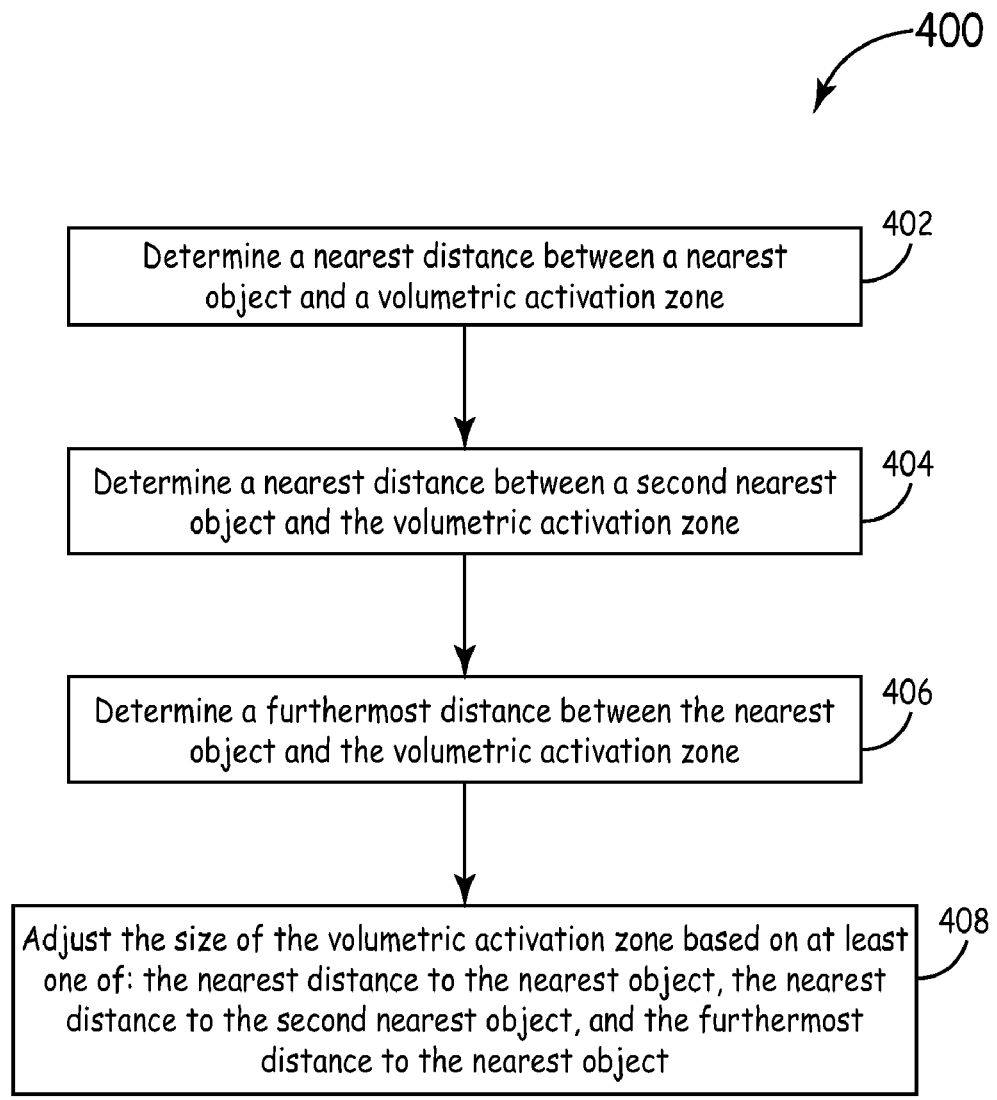
FIG. 4 is a flow chart illustrating a method of dynamically adjusting the activation zone of a cursor in a 3D environment.

FIG. 4 is a flow chart illustrating a method 400 of dynamically adjusting the activation zone of a cursor in a 3D environment. The particular embodiment of method 400 shown in FIG. 4 is described here as being implemented using the computer 100 of FIG. 1 and the 3D environment 200 of FIG. 2, though other embodiments are implemented in other ways. More specifically, the processing of method 400, in such an embodiment, would be implemented at least in part by the software 104 executed by the computer 100 (for example, by an operating system 106 or by one or more applications 108).

As used herein, the "nearest distance" of a particular object is calculated as the distance between the activation zone of cursor 202 and the nearest point of that object to the activation zone of cursor 202. Also, as used herein, the "nearest object" is the object displayed within the 3D environment 200 that has the smallest nearest distance. For example, in one implementation of such an embodiment where the volumetric activation zone 209 of cursor 202 has spherical shape, the nearest distance to a particular object is calculated as the distance between the center of the activation zone of cursor 202 and the nearest point of that object to the center of the activation zone of cursor 202. In other implementations (for example, where the volumetric activation zone 209 has non-uniform shape), the "nearest distance" of a particular object is the shortest distance from a point on the outer surface of the volumetric activation zone 209 of cursor 202 and the nearest point of that object to the activation zone of cursor 202. In other implementations and embodiments, the nearest distance is calculated in other ways.

It is to be understood that, in some embodiments, determining a particular distance comprises determining information indicative of that distance.

In the particular embodiment shown in FIG. 4, the nearest object displayed in the 3D environment 200 (and the nearest distance for that object) is determined for the current position of cursor 202 (block 402). Also, the second nearest object displayed in the 3D environment (and the nearest distance for that object) is determined for the current position of cursor 202 (block 404). Mathematically, to determine the nearest object and the nearest distance for that object from the center of the volumetric activation zone 209 of cursor 202, we suppose there are N objects $T_i (1 \leq i \leq N)$ displayed in the 3D environment. We let $(x_i, y_i, z_i)$ be the point(s) of $T_i$ and let $(x_0, y_0, z_0)$ be the center of the volumetric activation zone 209 of cursor 202. Now, we define the nearest distance of each object $T_i$ with $$N_i = \min(\sqrt{(x_i-x_0)^2+(y_i-z_0)^2+(z_i-z_0)^2}), (x_i,y_i,z_i) \epsilon T_i, 1 \leq i \leq N \quad (1)$$

When the center of cursor 202 $(x_0,y_0,z_0)$ is in or on the object $T_i$, $N_i=0$. Once we have $N_i$ determined for each object $T_i$, we sort each $N_i$ in an ascending list, $$N_{i_1} \leq N_{i_2} \leq \ldots \leq N_{i_j} \leq \ldots \leq N_{i_N}, 1 \leq j \leq N, 1 \leq i_j \leq N \quad (2)$$

From the ascending list we can observe that $T_{i_1}$ has the minimum nearest distance, object $T_{i_2}$ has the second minimum nearest distance, and object $T_{i_3}$ has the third minimum nearest distance, and so on.

In the particular embodiment shown in FIG. 4, the distance between the volumetric activation zone 209 of the cursor 202 and a point on the nearest object that is farthest from the volumetric activation zone 209 is also determined (block 406). This distance is also referred to here as the "furthermost distance of the nearest object." In one implementation of such an embodiment where distances are determined from the center of the volumetric activation zone 209 of cursor 202 as described above in connection with equations (1) and (2), the furthermost distance $F_i$ is determined, for example, with the following equation:

$$F_i = \max(\sqrt{(x_i-x_0)^2+(y_i-z_0)^2+(z_i-z_0)^2}), (x_i,y_i,z_i) \epsilon T_i, 1 \leq i \leq N \quad (3).$$

In the particular embodiment shown in FIG. 4, the size of the volumetric activation zone 209 is adjusted based on at least the furthermost distance $F_i$ of the nearest object $T_{i_1}$, the nearest distance $N_{i_1}$ of the closest object $T_{i_1}$, and the nearest distance $N_{i_2}$ of the second closest object $T_{i_2}$ (block 408). In particular, the size of the activation zone 209 of the cursor 202 is set within a range from equal to or greater than the nearest distance of the nearest object to less than the nearest distance of the second closest object. For example, where a spherical volumetric activation zone 209 of the cursor 202 is used, the furthermost distance $F_i$ of the nearest object $T_{i_1}$ and the nearest distance $N_{i_2}$ of the second nearest object $T_{i_2}$ is used to set a range for the radius of the spherical volumetric activation zone 209. The upper limit R for radius r of the spherical activation zone 209 is set to the smaller of the furthermost distance $F_i$ of the closest object $T_{i_1}$ and the nearest distance $N_{i_2}$ of the second closest object $T_{2_2}$. That is, the upper limit R for the radius r of the spherical volumetric activation zone 209 is determined by the equation:

$$R=\min(F_{i_1}, N_{i_2}) \quad (4).$$

The lower bound for radius r is set at the nearest distance $N_{i_1}$ of the closest object $T_{i_1}$, such that the radius r satisfies the following criteria: $N_{i_1} < r < R$. Thus, in the embodiment shown in FIG. 4, the size of the activation zone is adjusted such that a distance from a center point of the volumetric activation zone 209 to an edge of the volumetric activation zone is less than R, the smaller of the furthermost distance $F_i$ of the closest object $T_{i_1}$ and the nearest distance $N_{i_2}$ of the second closest object $T_{i_2}$, and greater than or equal to the nearest distance $N_{i_1}$ of the closest object $T_{i_1}$.

In one implementation of the embodiment shown in FIG. 4, changes in the size of spherical activation zone 209 of cursor 202 are reduced to enhance the aesthetics of cursor 202. Here, variations in the size of the activation zone are reduced by subjecting the radius r of the spherical volumetric activation zone 209 (after adjustment) to the following constraint:

$$\min(|r_{t-1}-r|), N_{i_1} \leq r \leq R \quad (5)$$

where $r_{t-1}$ is the radius of the spherical activation zone 209 at the time prior to the adjustment.

In other embodiments, the size of the volumetric activation zone 209 of the cursor 202 is changed (if necessary) in other ways. In one alternative embodiment, the size of the activation zone 209 is adjusted so that the each point of the outer surface of the activation zone 209 is equal to or greater than the nearest distance of the nearest object. As result, at least part of the nearest object will be included within the activation zone 209 of the cursor 202. For example, in one implementation of such an embodiment where the activation zone of cursor 202 is spherical, the radius of the activation zone r is set equal to or greater than the nearest distance of the nearest object.

In another alternative embodiment, the size of activation zone 209 of cursor 202 is adjusted based on the nearest distance of the second nearest object. As result, no part of the second nearest object will be included within the activation zone 209 of the cursor 202. For example, in one implementation of such an embodiment where the activation zone of cursor 202 is spherical, the radius r of the activation zone 209 is set to be smaller than the nearest distance to the second nearest object.

In the embodiment shown in FIG. 4, it is assumed that the nearest distance for the nearest object is different from the nearest distance of all the other objects (that is, where the constraint $N_{i_1} < N_{i_j} \leq N_{i_N}$, $1 \leq j \leq N$, $1 \leq i_j \leq N$ holds). Where that is not the case, some mechanism should be provided to determine which objects should be considered to be within the volumetric activation zone 209.

Figure 5:
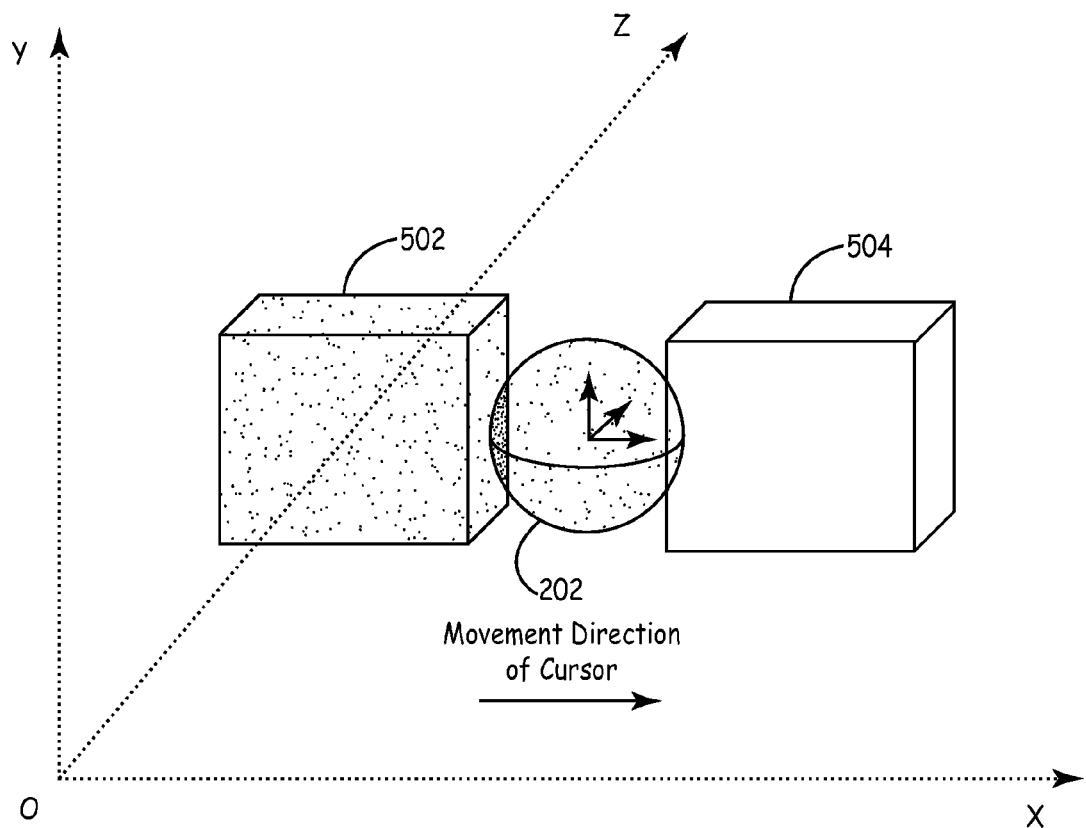
FIG. 5 is a perspective view of one embodiment of the 3D environment of FIG. 1 illustrating the cursor in a position equidistant between two objects.

Examples such mechanisms are described below in connection with FIGS. 5 and 6. Referring now to FIG. 5, one example of environment 200 is shown illustrating two objects 502, 504 which are equidistant from cursor 202. In other words, the nearest distance of object 502 is the same distance from the activation zone of cursor 202 as the nearest distance of object 504. One approach for responding to this situation has the activation zone 209 is sized such that at least part of both objects 502 and 504 is included within the activation zone 209. Another approach for responding to this situation has the activation zone 209 is sized such that that no part of either objects 502 or 504 is included within the activation zone 209. In either case, when such a situation is encountered, only one of the objects 502 or 504 is deemed to be within the activation zone 209 for the purposes selecting or otherwise affecting such objects regardless of the actual presence of objects 502, 504 within activation zone 209. Thus, even though both or neither of objects 502, 504 are actually within activation zone, cursor 202 recognizes one of objects 502, 504 as within the activation zone. In one embodiment, the object which was within activation zone at a time immediately preceding the time when the two objects became equidistant from the activation zone 209 of cursor 202 remains the object currently recognized as within the activation zone. For example, as shown in FIG. 5, when cursor 202 moves away from object 502 toward object 504, there is a position at which the nearest distance $N_{i_1}$ to object 502 is equal to the nearest distance $N_{i_2}$ to object 504. At this position cursor 202 recognizes object 502 as within the spherical volumetric activation zone 209 of the cursor 202, and object 504 as outside of the spherical volumetric activation zone 209. That is, object 502 is recognized as within the spherical volumetric activation zone 209 because object 502 was the object within the activation zone 209 at the time immediately preceding the current time. When cursor 502 passes through the equidistant position and moves closer to object 504, cursor 202 re-enters the normal operating state and the activation zone 209 is sized such that object 506 is the only object within the activation zone 209. In some applications, recognizing the object which was previously within the activation zone as still currently within the activation zone may reduce uncertainty as to which object is within the activation zone.

In an alternative embodiment, cursor 202 recognizes the object that was not previously within the activation zone 209 as the object within the activation zone 209 when two objects are equidistant from cursor 202.

Figure 6:
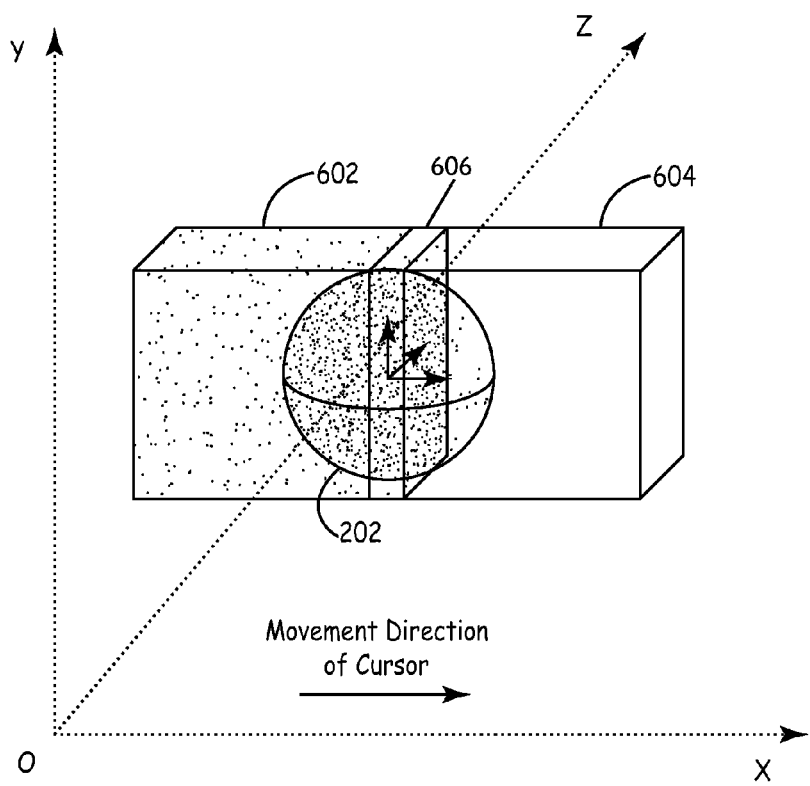
FIG. 6 is a perspective view of one embodiment of the 3D environment of FIG. 1 illustrating the cursor in a position where two objects overlap.

Another special situation occurs when two or more objects overlap each other as shown by objects 602 and 604 in FIG. 6. In one embodiment, when the center of cursor 202 is positioned in a volume where objects 602, 604 overlap, cursor 202 is sized according to the special criteria described above with respect to FIG. 5 and recognizes only one object as within the activation zone 209. When the center point of the activation zone is within the volume of two (or more) overlapping objects 602, 604, the overlapping objects are actually objects which are equidistant from the activation zone of cursor 202. Thus, in one such embodiment, the object which was previously within the activation zone is recognized as the object currently within the activation zone. For example, in FIG. 6, object 602 and object 604 overlap. As cursor 202 moves away from object 602 toward object 604, the center of the activation zone enters the volume 606 in which object 602 and object 604 overlap. Within volume 606, $N_{object_1} = N_{object_2} = 0$. Thus, cursor 202 recognizes object 602 as the only object within the activation zone until cursor 202 leaves the volume 606. Then, assuming the movement shown in FIG. 6, the center of the activation zone is closer to object 604. As described with respect to FIG. 5, in an alternate embodiment, cursor 202 recognizes the object which was not previously within the activation zone (object 604) as the object currently within the activation zone when the center of cursor 202 is positioned in the volume in which objects 602, 604 overlap.

In one embodiment, the opacity level of objects is increased when a portion of the particular object is within (or recognized as within) the activation zone 209 of cursor 202. This is shown in FIGS. 2, 5, and 6. This provides a visual indication of which object is within the activation zone and, thus, which object is capable of having action taken on it at the particular time. For example, in FIG. 2, object 207 is within the activation zone 209 of cursor 202, and the opacity level of object 207 is increased (darkened). In FIG. 5, the opacity level of object 502 is increased to show that object 502 is recognized as within the activation zone of cursor 202. Similarly, in FIG. 6, the opacity level of object 602 is increased to show that object 602 is recognized as within the activation zone of cursor 202. In one embodiment, when an object is selected by cursor 202, the opacity level of the object is set darker (higher) than before the object was selected.

Figure 7:
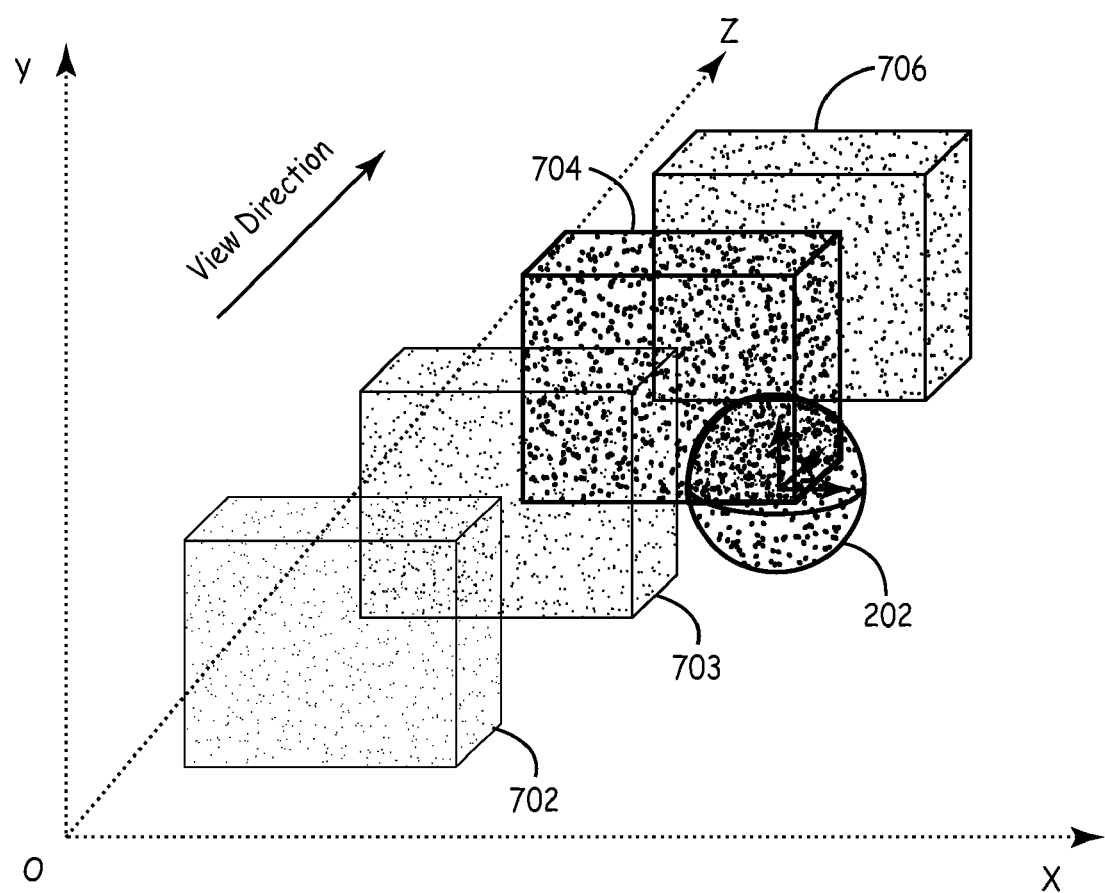
FIG. 7 is a perspective view of one embodiment of a 3D environment having objects of varied opacity levels.
Figure 8:
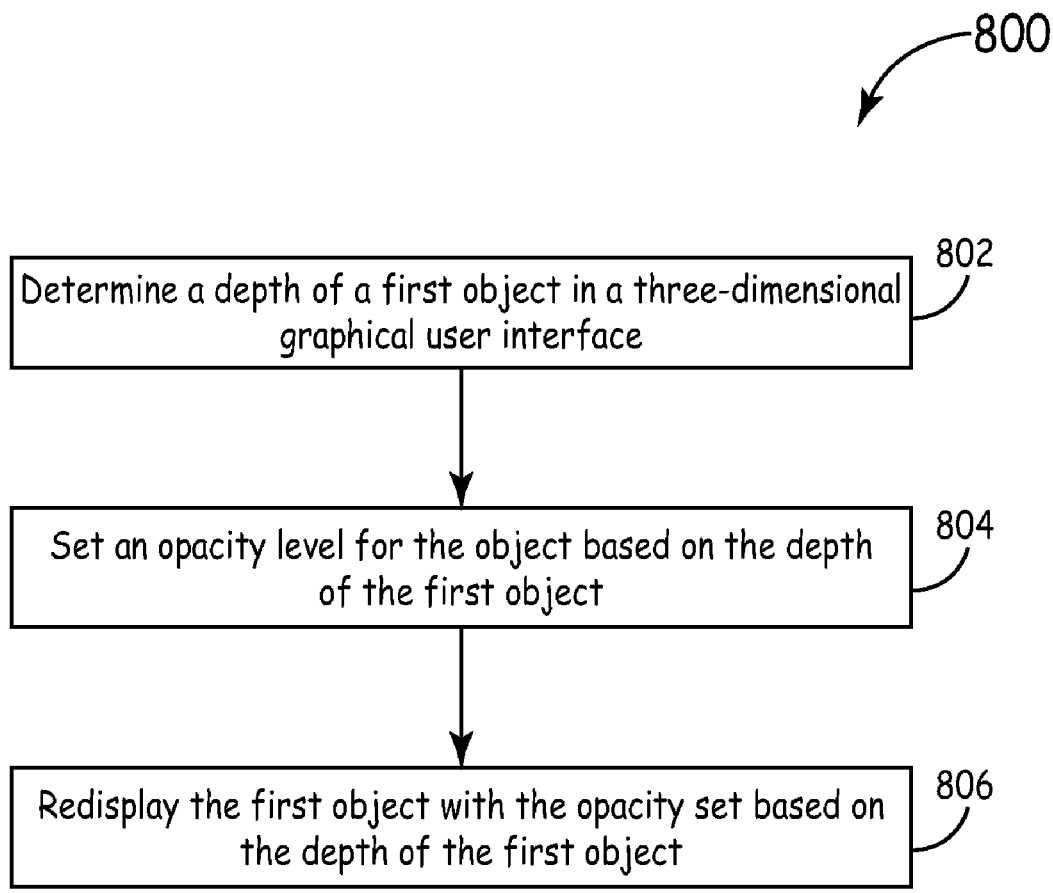
FIG. 8 is a flow chart of one embodiment of a method of displaying an object on a three-dimensional display device.

Referring now to FIG. 7, in one embodiment, to enhance the 3D environment, the opacity level of objects 702-705 is set based on the depth of the object 702-705 in the 3D environment. One embodiment of a method 800 for displaying objects in a three-dimensional environment is shown in FIG. 8. The particular embodiment of method 800 shown in FIG. 3 is described here as being implemented using the computer 100 of FIG. 1 and the 3D graphical environment of FIG. 7, though other embodiments are implemented in other ways. More specifically, the processing of method 800, in such an embodiment, would be implemented at least in part by the software 104 executed by the computer 100 (for example, by an operating system 106 or by one or more applications 108).

At block 802, a depth of a first object is determined. At block 804, an opacity of the first object is set based on the depth of the first object. Then, the first object is redisplayed on the display device with the new opacity (block 806). In one embodiment, setting and redisplaying the object is performed dynamically as software 104 is executed.

In one embodiment, the depth of an object is determined by calculating a distance from a user's viewpoint to the object. Thus, referring to FIG. 7, object 702 is the closest to a user's viewpoint, thus object 702 has the lightest opacity. Object 703 is back further from the user's viewpoint than object 702 and, thus, has a darker opacity than object 702. Object 705 is back further than both object 702 and object 703 and, as such, has a darker opacity than both object 702 and object 703.

In one embodiment, an object that is within the activation zone is set to a darker opacity level than the darkest opacity level setting for objects based on depth (objects that are neither within the activation zone, nor otherwise selected). Thus, as shown in FIG. 7, object 704 has the darkest opacity of objects 702-705 since object 704 is currently within the activation zone of cursor 202. This enables the object that is within the activation zone (object 704) to be identified as such among the objects that are displayed within the 3D environment. In addition, in one embodiment, when an object is selected, the opacity level of that object is set to a level darker than the level of the object when it is within the activation zone prior to being selected. In an alternative embodiment, the opacity level of an object which is within the activation zone is increased by an amount from its current opacity level, regardless of the opacity of other objects. In such an embodiment, the opacity level is not necessarily set to a level darker than the darkest allowed opacity level for objects based on depth.

In another embodiment, the depth is determined based on a number of objects which occlude an object directly or a number of objects which are in an occlusion chain with the object. Again, referring to FIG. 7, object 702 has zero (0) objects occluding it and thus, is set to a lighter opacity level than each of the other objects 703-705. Object 703 is directly occluded by object 702, thus the opacity level of object 703 is set darker than object 702. Object 705 is in an occlusion chain because object 705 is occluded by object 704, which is occluded by object 703, which is occluded by object 702. Each object in the occlusion chain is set to a darker opacity level the object in front of it. Thus, object 705 is set darker than object 703, which is darker than object 702. As stated above, object 704 is darker than object 705 because object 704 is within the activation zone of cursor 202.

To explain this mathematically, we assume there are i−1 objects which occlude an object $T_i$, and $T_i$ occludes M−i objects in a 3D display. Those objects are defined by $T_1, T_2, \ldots, T_i, \ldots, T_M (1 \leq i \leq M)$. $O(T_i)$ is the opacity level of the object $T_i$ ($1 \leq i \leq M$). The minimum opacity level is set as $O_{min} \epsilon [0, 1]$ and the maximum opacity level is set as $O_{max} \epsilon [0, 1]$ ($O_{min} < O_{max}$). In one embodiment, $O(T_i)$ ($1 \leq i \leq M$) by interpolation. Examples of interpolations which could be used include linear interpolation, polynomial interpolation, or spline interpolation.

Increasing the opacity level for objects which are farther away from the viewpoint enables objects to be seen even if the object is occluded by another object. For example, as shown in FIG. 7, object 702 partially occludes object 703; however, object 703 is still visible behind object 702. Each object 702-705 has an opacity level based on its distance from a point or plane determined to be the user's viewpoint. The opacity level is set between a defined minimum and maximum value. In one embodiment, the opacity level for each object 702-705 is determined by interpolation. Examples of interpolations which could be used include linear interpolation, polynomial interpolation, or spline interpolation.

In yet another embodiment, everything behind an object that is within the activation zone (object 704) is set to the maximum opacity level. Thus, the opacity level of each object is set according to the following and calculated by interpolation: $O(T_{i+1})=O(T_{i+2})= \ldots =O(T_M)=O_{max}$. $O(T_j)$ ($1 \leq j \leq i$). Again, examples of interpolations which could be used include linear interpolation, polynomial interpolation, or spline interpolation. As an example, when object 704 is selected, and linear interpolation is used, the opacities are determined from the following equations:

$$O(T_{object_1}) = O_{min}, O(T_{object_2}) = \frac{O_{min} + O_{max}}{2},$$
$$O(T_{object_3}) = O_{max} \text{ and } O(T_{object_4}) = O_{max}.$$

In still another embodiment, the objects 702-705 are set lighter in opacity as an object is deeper in the 3D environment. In another alternative embodiment, the opacity levels are reversed such that objects which are occluded by other objects are set lighter than the objects which occlude them.

Figure 9:
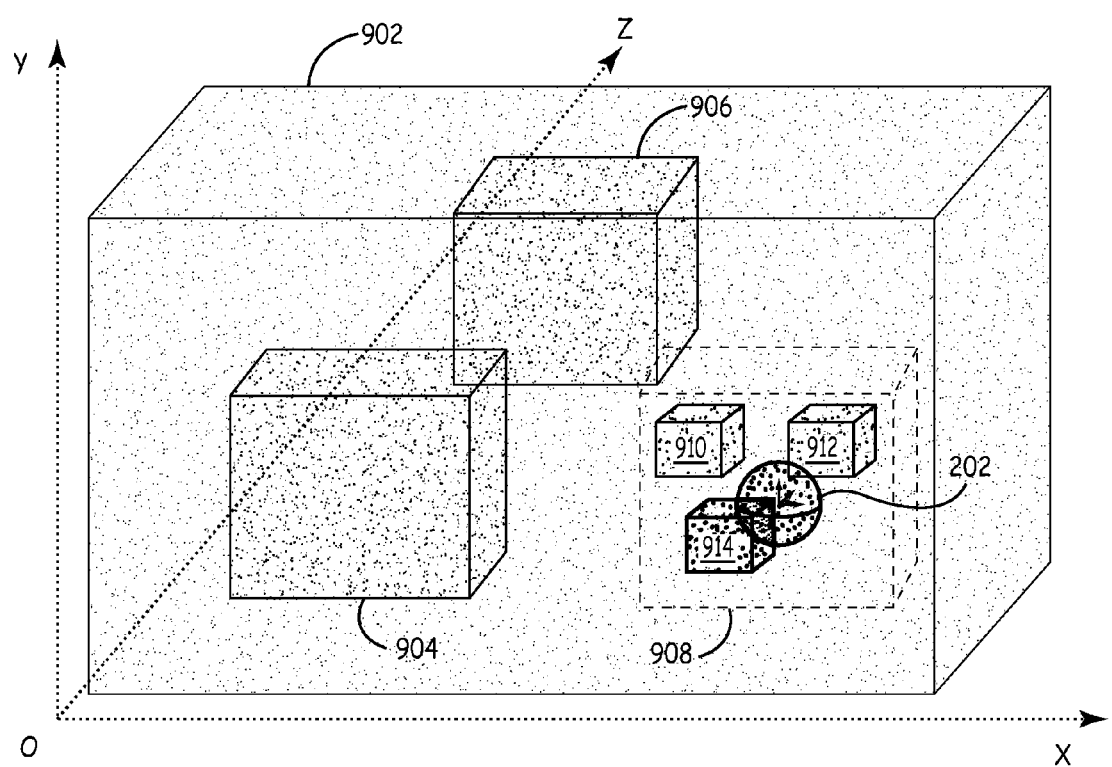
FIG. 9 is a perspective view of one embodiment of a 3D environment having objects of varied opacity levels.

FIG. 9 illustrates another situation where the opacity level of an object is adjusted. FIG. 9 illustrates object 902 which contains objects 904, 906, 908, 910, 912, and 914. Thus, objects 904, 906, 908, 910, 912, and 914 are occluded by object 902. Additionally, object 908 contains objects 910, 912, and 914. In this embodiment, the opacity level is set based on whether an object is within another object. For example, object 904 and object 906 are within object 902 and have their opacity level set darker than object 902. Additionally, in one embodiment, the immediate object in which cursor 202 is within is identified by illustrating that object in wireframe. For example, in FIG. 9 cursor 202 is within object 908 and, therefore, object 908 is shown in wireframe. Object 914 is within the activation zone of cursor 902 and thus has a darkened opacity level.

Although specific embodiments have been illustrated and described herein, it will be appreciated by those of ordinary skill in the art that any arrangement, which is calculated to achieve the same purpose, may be substituted for the specific embodiments shown. It is manifestly intended that any inventions be limited only by the claims and the equivalents thereof.

What is claimed is:

1. A method of controlling a cursor displayed on a display device, the method comprising:
   displaying a three-dimensional environment on a display device;
   displaying, on the display device, a cursor and a plurality of objects within the three-dimensional environment, wherein the cursor comprises a zone defining a volume to identify at least one object that is at least partially located within the volume;
   dynamically adjusting the size of the zone so that a predetermined constraint is satisfied, wherein the predetermined constraint is a function of at least a relationship between the zone and at least one of the plurality of objects, wherein the size of the zone is dynamically adjusted such that it is possible for more than one object to be located within the zone at the same time; and
   recognizing one object located within the zone as an active object.

2. The method of claim 1, wherein the predetermined constraint comprises at least one of: a constraint specifying that only a predetermined number of objects are at least partially located within the volume and a constraint specifying each change in the size of the zone is the minimum change that otherwise satisfies any other constraints.

3. The method of claim 1, wherein dynamically adjusting the size of the zone comprises:
   determining a first distance within the three-dimensional environment between a first object of the plurality of objects and the zone; and
   changing a size of the zone based on at least the first distance.

4. The method of claim 3, wherein determining the first distance comprises at least one of:
   determining a distance from a center of the zone to a nearest point of the first object;
   determining a distance from a center of the zone to a farthest point of the first object;
   determining a distance from an outer surface of the zone to the first object; and
   determining a distance from the zone to a point of the first object which is nearest to the zone.

5. The method of claim 4, wherein changing the size of the zone based on the first distance comprises changing the size of the zone such that a distance from a center of the zone to a point on the outer surface of the zone is larger than the first distance.

6. The method of claim 3, further comprising determining a second distance from the zone to a second object, wherein changing the size of the zone comprises changing the size of the zone based on at least the first distance and the second distance.

7. The method of claim 6, wherein determining the first distance comprises determining a distance from the center of the zone to a point of the first object that is nearest to the center of the zone and wherein determining the second distance comprises determining a distance from the center of the zone to a point of the second object that is nearest to the center of the zone, wherein the second object is second nearest to the zone;

wherein changing the size of the zone comprises changing the size of the zone such that a distance from a center of the zone to a point on the outer surface of the zone is smaller than the lesser of the second distance and the distance between the center of the zone and the point of the nearest object that is farthest from the center of the zone.

8. The method of claim 7, wherein changing the size of the zone comprises changing the size of the zone such that a distance from a center of the zone to a surface of the zone is greater than or equal to the point of the nearest object that is nearest to the center of the zone.

9. The method of claim 8, wherein changing the size of the zone comprises changing the size of the zone such that a distance from a center of the zone to a surface of the zone is smaller than or equal to the distance from the center of the zone to a point of the second nearest object that is nearest to the center of the zone.

10. The method of claim 1, wherein if more than one object is located within the zone at the same time, the first of said more than one objects to have come within the zone is recognized as the active object.

11. The method of claim 1, wherein if more than one object is located within the zone at the same time, the last of said more than one objects to have come within the zone is recognized as the active object.

12. The method of claim 1, wherein the size of the zone is dynamically adjusted such that more than one object is located within the zone at the same time when a plurality of objects are equidistant from the center of the zone.

13. A system for controlling a cursor in a three-dimensional environment, the system comprising:
a processor to execute software;
a display device communicatively coupled to the processor;
an input device communicatively coupled to the processor in order to receive input from the input device; and
a storage medium communicatively coupled to the processor from which the processor reads at least a portion of the software for execution thereby, wherein the software is configured to cause the processor to:
display a three-dimensional environment on the display device;
display, on the display device, a cursor and a plurality of objects within the three-dimensional environment, wherein the cursor comprises a volumetric activation zone defining a volume to identify at least one object that is at least partially located within the volume;
dynamically adjust the size of the volumetric activation zone so that a predetermined constraint is satisfied, wherein the predetermined constraint is a function of at least a relationship between the zone and at least one of the plurality of objects, wherein the software is configured to cause the processor to dynamically adjust the size of the volumetric activation zone such that it is possible for more than one object to be located within the volumetric activation zone at the same time; and
recognize one object within the volumetric activation zone as an active object.

14. The system of claim 13, wherein the predetermined constraint comprises at least one of: a constraint specifying that only a predetermined number of objects are at least partially located within the volume and a constraint specifying each change in the size of the volumetric activation zone is the minimum change that otherwise satisfies any other constraints.

15. The system of claim 13, wherein the software is configured to cause the processor to:
determine a first distance within the three-dimensional environment between a first object of the plurality of objects and the volumetric activation zone; and
changing a size of the volumetric activation zone based on at least the first distance.

16. The system of claim 15, wherein the software is configured to cause the processor to determine the first distance by doing at least one of:
determining a distance from a center of the volumetric activation zone to a nearest point of the first object;
determining a distance from a center of the volumetric activation zone to a farthest point of the first object;
determining a distance from an outer surface of the volumetric activation zone to the first object; and
determining a distance from the volumetric activation zone to a point of the first object which is nearest to the volumetric activation zone.

17. The system of claim 13, wherein the software is configured so that if more than one object is located within the volumetric activation zone at the same time, the processor recognizes the first of the more than one objects to have come within the volumetric activation zone as the active object.

18. The system of claim 13, wherein the software is configured so that if more than one object is located within the volumetric activation zone the processor at the same time, the processor recognizes the last of the more than one objects to have come within the volumetric activation zone as the active object.

19. The system of claim 13, wherein the software is configured to cause the processor to dynamically adjust the size of the volumetric activation zone such that more than one object is located within the volumetric activation zone at the same time when a plurality of objects are equidistant from the center of the volumetric activation zone.

20. A program product comprising a non-transitory processor-readable medium on which program instructions are embodied, wherein the program instructions are operable, when executed by at least one programmable processor included in a device, to cause the device to:
display a three-dimensional environment on a display device communicatively coupled to the device;
display, on the display device, a cursor and a plurality of objects within the three-dimensional environment, wherein the cursor comprises an activation zone defining a volume to identify at least one object that is at least partially located within the volume;
dynamically adjust the size of the activation zone so that a predetermined constraint is satisfied, wherein the predetermined constraint is a function of at least a relationship between the zone and at least one of the plurality of objects; and
wherein the size of the activation zone is dynamically adjusted such that it is possible for more than one object to be located within the activation zone at the same time and wherein if more than one object is located within the activation zone at the same time, only one of the objects within the activation zone is recognized as an active object.

21. The program product of claim 20, wherein the predetermined constraint comprises at least one of: a constraint specifying that only a predetermined number of objects are at least partially located within the volume and a constraint specifying each change in the size of the activation zone is the minimum change that otherwise satisfies any other constraints.

22. A method of controlling a cursor displayed on a display device, the method comprising:
displaying a three-dimensional environment on a display device;
displaying, on the display device, a cursor and a plurality of objects within the three-dimensional environment, wherein the cursor comprises a zone defining a volume to identify at least one object that is at least partially located within the volume;
if there is only one object that is nearest to the center of the zone, dynamically adjusting the size of the zone so that said only one object is at least partially within the zone; and
if there is more than one object nearest to the center of the zone, dynamically adjusting the size of the zone so that no object is within the zone.

\* \* \* \* \*